United States Patent
Yamashita et al.

(10) Patent No.: US 10,498,395 B2
(45) Date of Patent: Dec. 3, 2019

(54) POWER LINE COMMUNICATION APPARATUS AND ELECTRONIC CONTROL APPARATUS INCLUDING POWER LINE COMMUNICATION APPARATUS

(71) Applicant: Hitachi Automotive Systems, Ltd., Hitachinaka-shi, Ibaraki (JP)

(72) Inventors: Hiroki Yamashita, Tokyo (JP); Taizo Yamawaki, Tokyo (JP); Ming Liu, Tokyo (JP); Teppei Hirotsu, Tokyo (JP); Ryosuke Ishida, Hitachinaka (JP); Hirofumi Kurimoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/067,663

(22) PCT Filed: Jan. 4, 2016

(86) PCT No.: PCT/JP2016/050032
§ 371 (c)(1),
(2) Date: Jul. 2, 2018

(87) PCT Pub. No.: WO2017/119054
PCT Pub. Date: Jul. 13, 2017

(65) Prior Publication Data
US 2019/0007100 A1    Jan. 3, 2019

(51) Int. Cl.
*H04B 3/54* (2006.01)
*H04L 25/02* (2006.01)
(Continued)

(52) U.S. Cl.
CPC ............ *H04B 3/548* (2013.01); *H04B 3/542* (2013.01); *H04B 14/026* (2013.01); *H04L 25/02* (2013.01);
(Continued)

(58) Field of Classification Search
CPC combination set(s) only.
See application file for complete search history.

(56) References Cited

U.S. PATENT DOCUMENTS 5,967,940 A * 10/1999 Yamaguchi ............ B60K 6/24
                                                      477/107
6,498,698 B1 * 12/2002 Golowka ................. G11B 5/54
                                                       360/75
(Continued)

FOREIGN PATENT DOCUMENTS

JP       2007-306209 A      11/2007
JP       2010-81340 A        4/2010
WO    WO 2012/056927 A1    5/2012

OTHER PUBLICATIONS

International Search Report (PCT/ISA/210) issued in PCT Application No. PCT/JP2016/050032 dated Feb. 9, 2016 with English translation (four (4) pages).
(Continued)

*Primary Examiner* — Linda Wong
(74) *Attorney, Agent, or Firm* — Crowell & Moring LLP

(57) ABSTRACT

A power line communication apparatus includes a drive block including an actuator control circuit and a drive circuit and a communication block. The actuator control circuit generates a control pulse for controlling an actuator, and controls a transition timing of the control pulse during an operation period set within a communication cycle by a communication clock. The drive circuit controls a driving current of the actuator supplied from a DC power source through a power line based on the control pulse in which the transition timing is controlled. The communication block generates the communication clock, and modulates a current flowing through the power line in response to data to be
(Continued)

transmitted during a signal transmission period different from the operation period, set within the communication cycle.

15 Claims, 16 Drawing Sheets

(51) Int. Cl.
  *H04B 14/02* (2006.01)
  *H04L 25/49* (2006.01)
(52) U.S. Cl.
  CPC ........ *H04L 25/028* (2013.01); *H04L 25/0264* (2013.01); *H04L 25/4902* (2013.01); *H04B 2203/5416* (2013.01); *H04B 2203/5445* (2013.01); *H04B 2203/5458* (2013.01)

(56) References Cited

U.S. PATENT DOCUMENTS

| | | | | |
|---|---|---|---|---|
| 6,956,345 | B2* | 10/2005 | Iribe | B25J 9/1633 318/568.12 |
| 6,989,645 | B2* | 1/2006 | Iribe | B25J 9/1633 318/568.12 |
| 7,825,623 | B2* | 11/2010 | Yanagihara | B60K 7/0007 318/812 |
| 7,889,476 | B2* | 2/2011 | King, Jr. | H01H 89/06 361/160 |
| 8,248,762 | B2* | 8/2012 | Williams | G05B 19/0423 361/601 |
| 8,659,183 | B2* | 2/2014 | Crist | A01G 25/16 307/38 |
| 9,739,840 | B2* | 8/2017 | Cordray | G01R 31/40 |
| 9,944,193 | B2* | 4/2018 | Uejima | B60L 11/1833 |
| 2002/0126091 | A1* | 9/2002 | Rosenberg | A63F 13/285 345/161 |
| 2003/0076221 | A1* | 4/2003 | Akiyama | H04L 12/40182 340/12.32 |
| 2008/0018465 | A1 | 1/2008 | Ootaka | |
| 2008/0084648 | A1* | 4/2008 | King | H01H 89/06 361/160 |
| 2008/0303679 | A1* | 12/2008 | Vrla | H02J 7/0042 340/636.1 |
| 2009/0079269 | A1* | 3/2009 | Jin | H02J 5/005 307/104 |
| 2010/0070141 | A1 | 3/2010 | Tanaka et al. | |
| 2010/0329320 | A1* | 12/2010 | Umehara | G06N 7/02 375/227 |
| 2011/0064126 | A1* | 3/2011 | Ishiko | H04B 3/544 375/222 |
| 2013/0043985 | A1* | 2/2013 | Lai | G05B 19/19 340/12.32 |
| 2013/0195208 | A1* | 8/2013 | Umehara | H04B 3/542 375/257 |
| 2013/0334872 | A1* | 12/2013 | Kodama | H02J 3/385 307/1 |
| 2015/0115809 | A1* | 4/2015 | Siessegger | H05B 33/0803 315/185 R |
| 2015/0180517 | A1* | 6/2015 | Abe | G08C 17/00 455/99 |
| 2015/0372753 | A1* | 12/2015 | Jovicic | H04B 10/116 398/172 |
| 2016/0006482 | A1* | 1/2016 | Schwager | H04B 3/56 375/257 |
| 2016/0156299 | A1* | 6/2016 | Romanowich | H02P 29/0241 318/400.21 |
| 2016/0250940 | A1* | 9/2016 | Uejima | B60L 11/1833 701/22 |
| 2016/0336896 | A1* | 11/2016 | Peet | H02S 20/32 |

OTHER PUBLICATIONS

Japanese-language Written Opinion (PCT/ISA/237) issued in PCT Application No. PCT/JP2016/050032 dated Feb. 9, 2016 (four (4) pages).
Arabia et al., "Electromechanical Actuators for Automotive Applications Exploiting Power Line Communication", International Symposium on Power Electronics, Electrical Drives, Automation and Motion, Speedam 2006, May 23, 2006, pp. 909-914.

\* cited by examiner

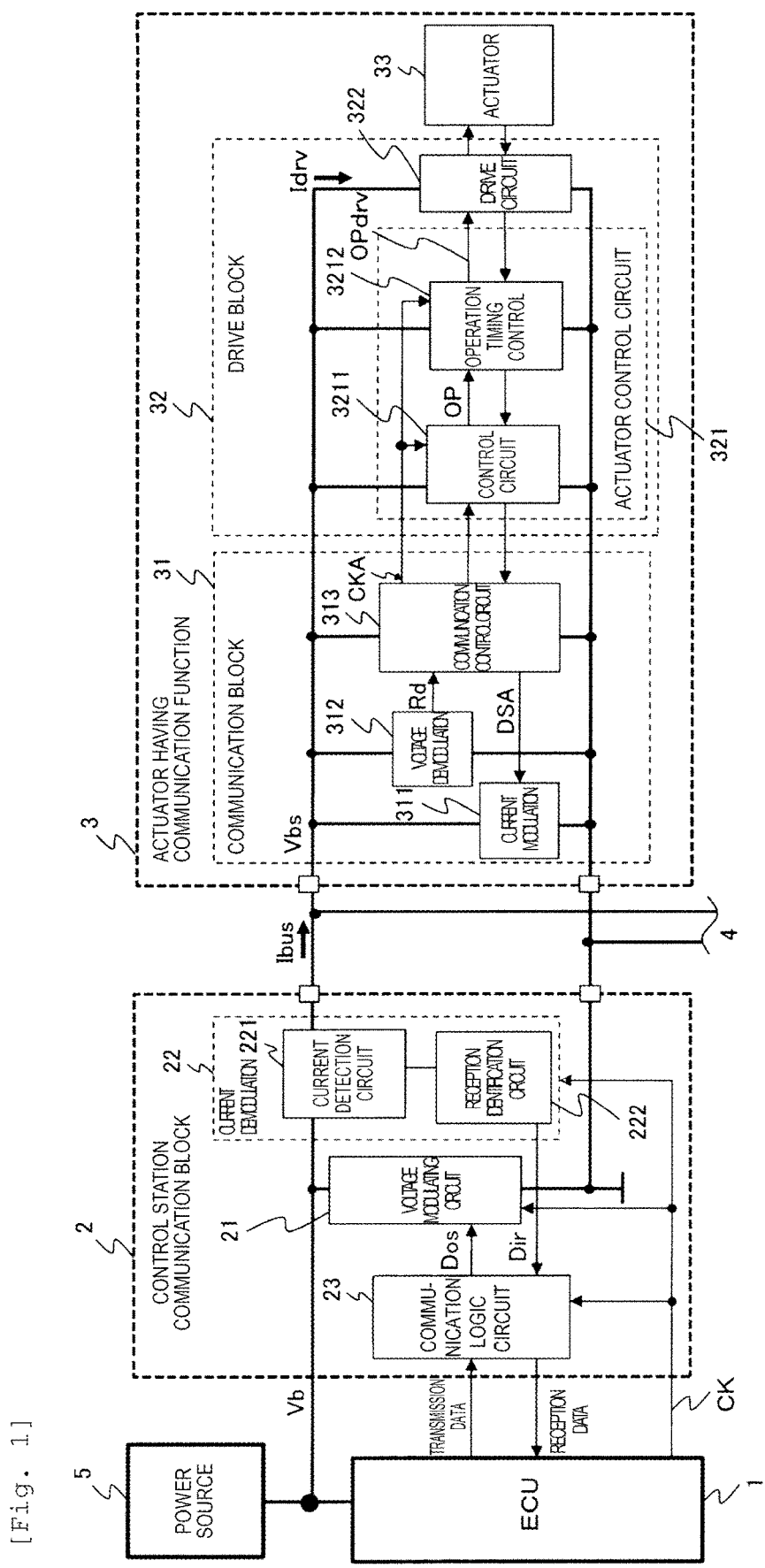
[Fig. 1]

[Fig. 2]
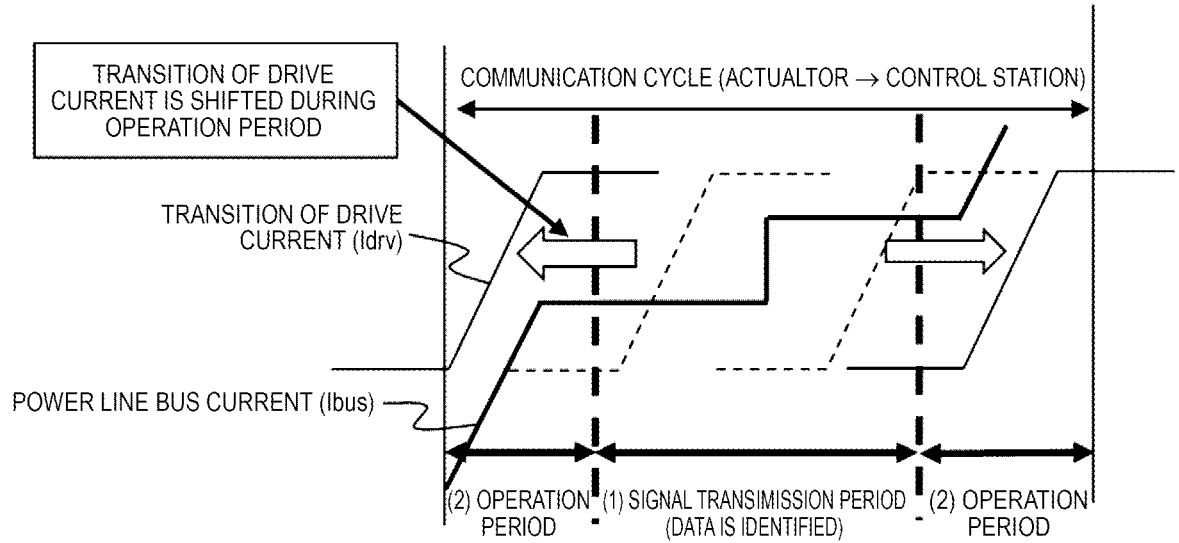
[Fig. 3]
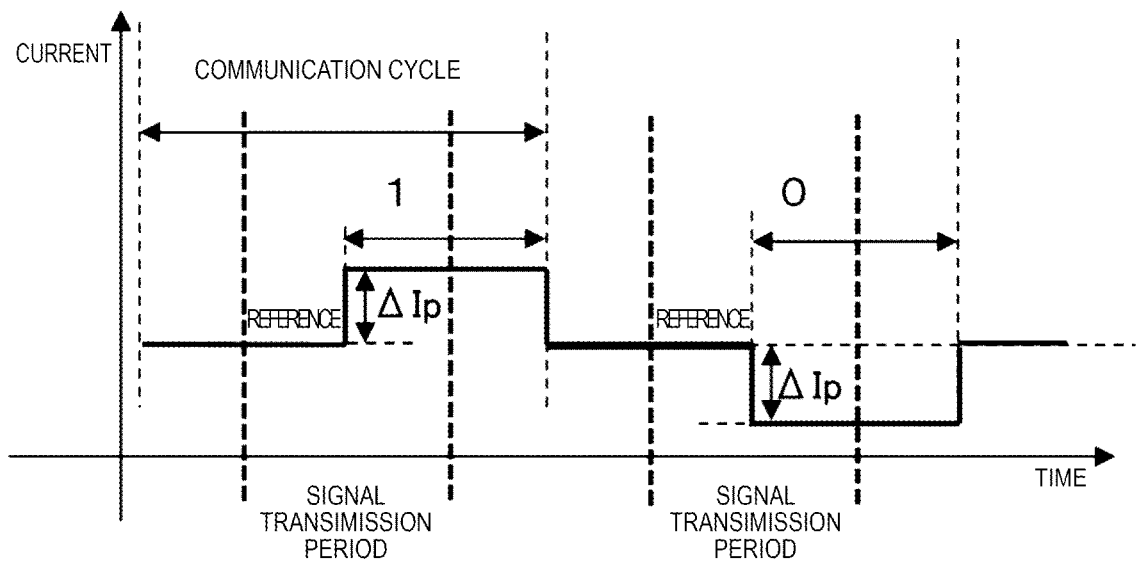

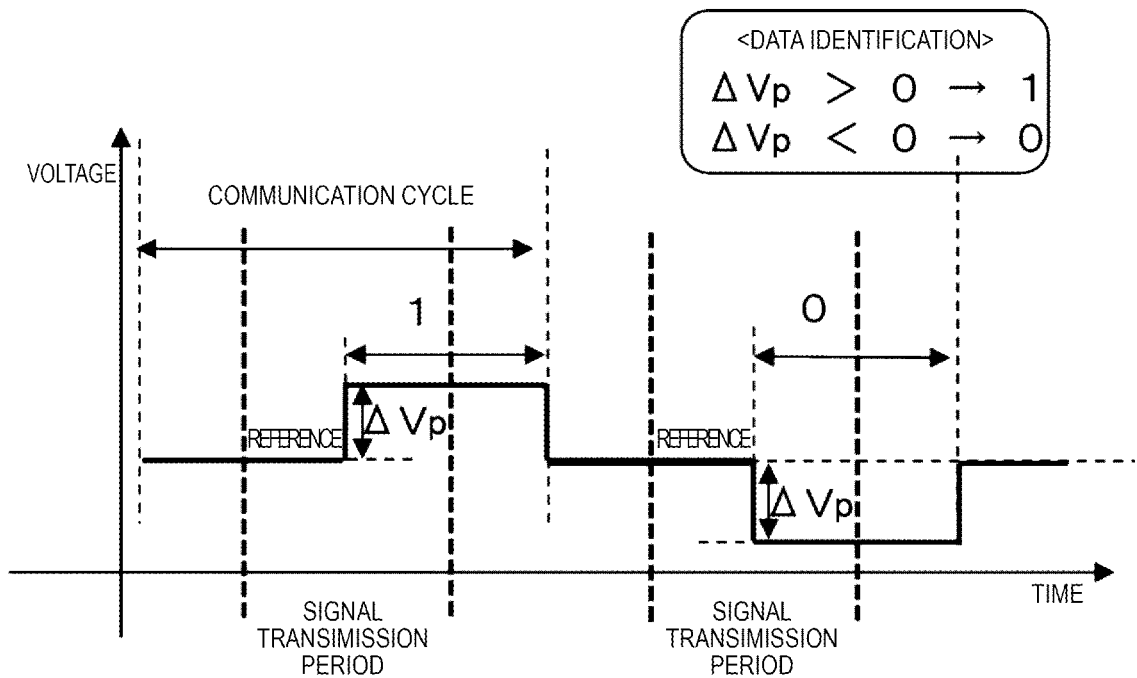
[Fig. 4]

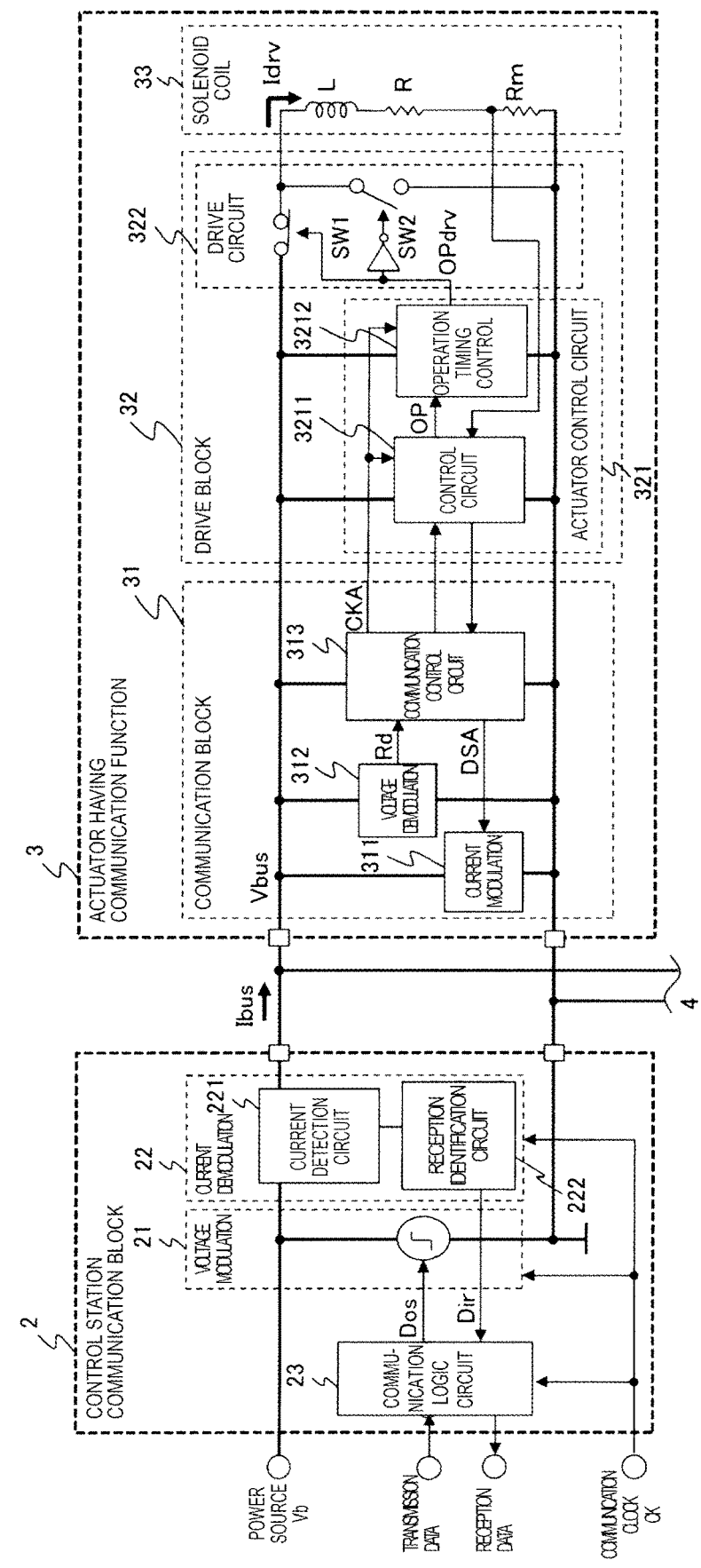
[Fig. 5]

[Fig. 6]
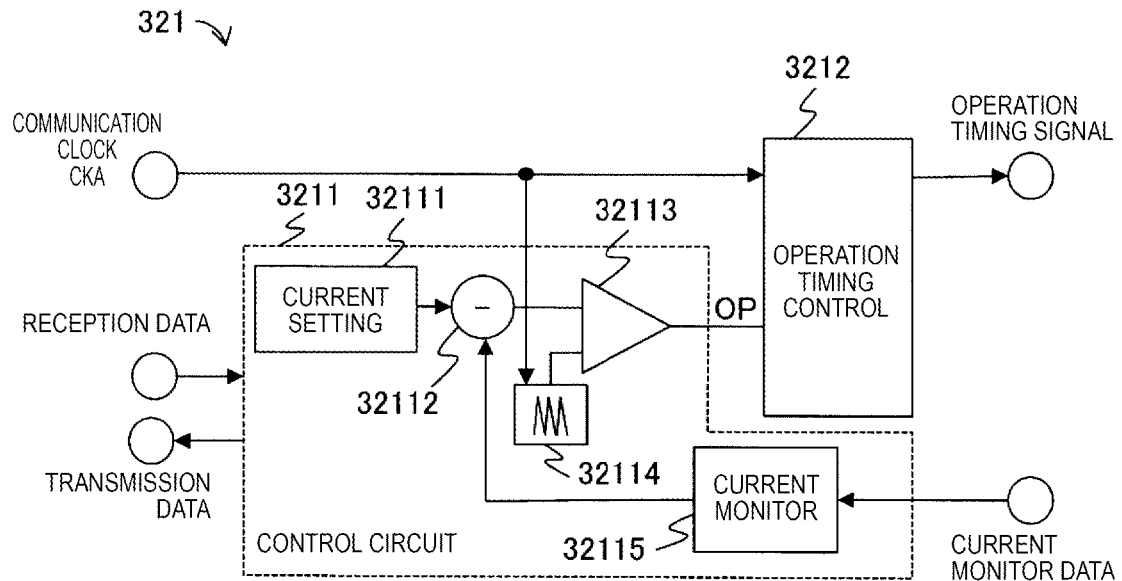
[Fig. 7]
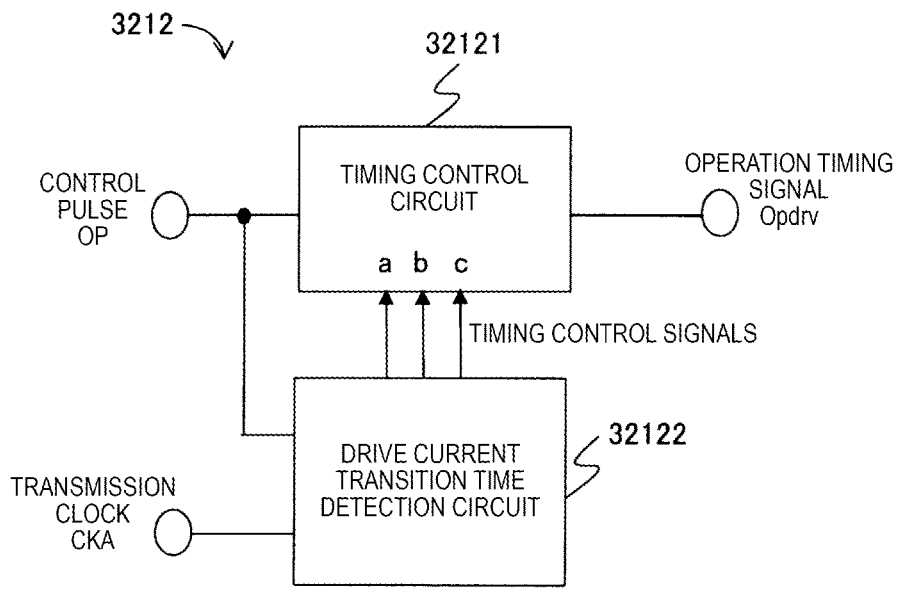

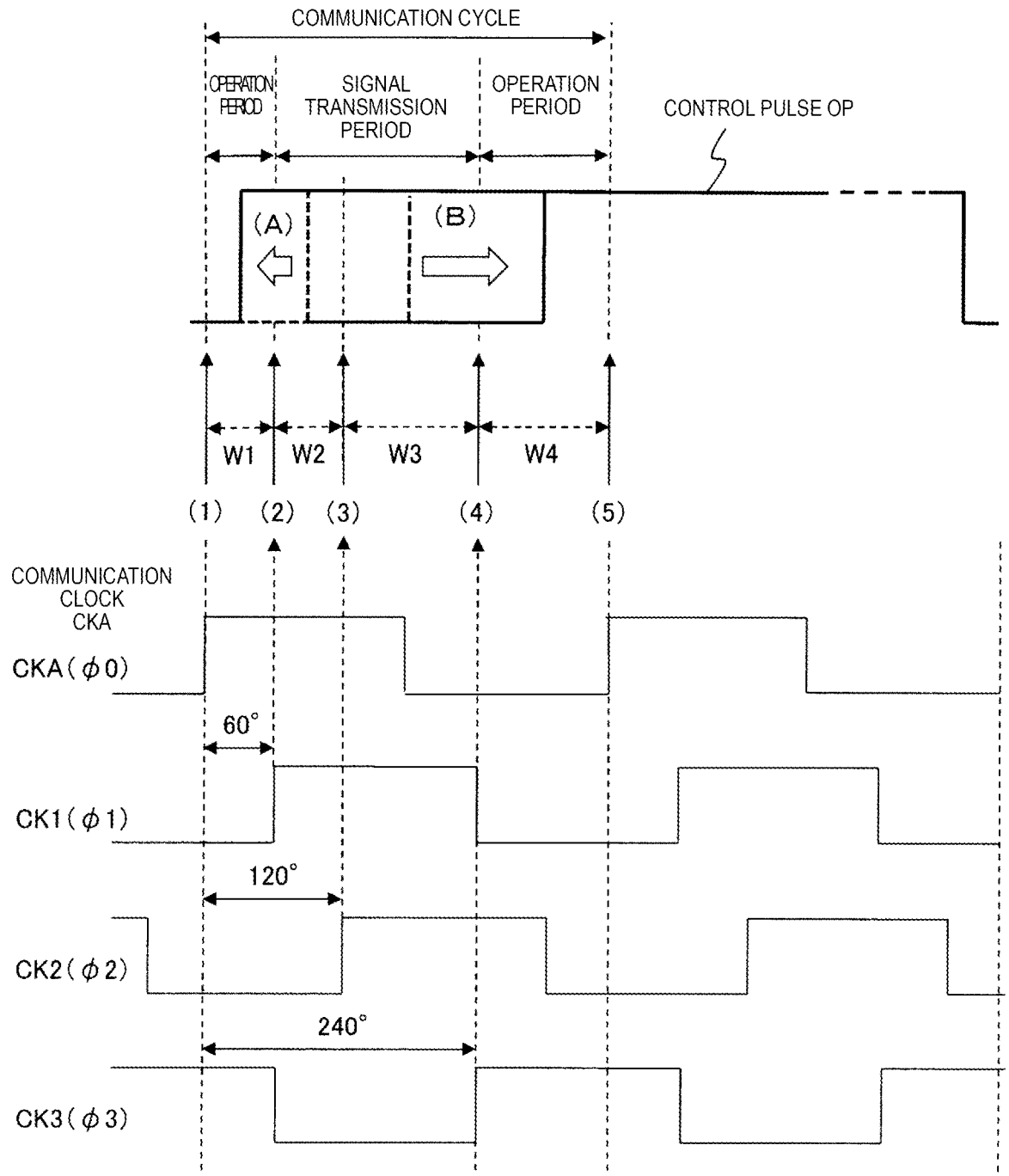
[Fig. 8]

[Fig. 9A]
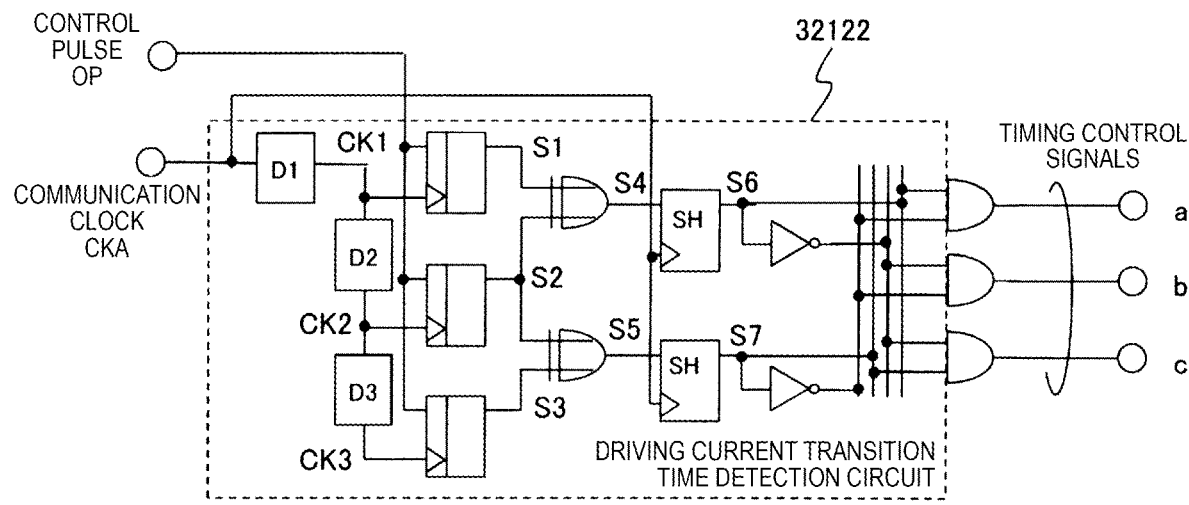

[Fig. 9B]
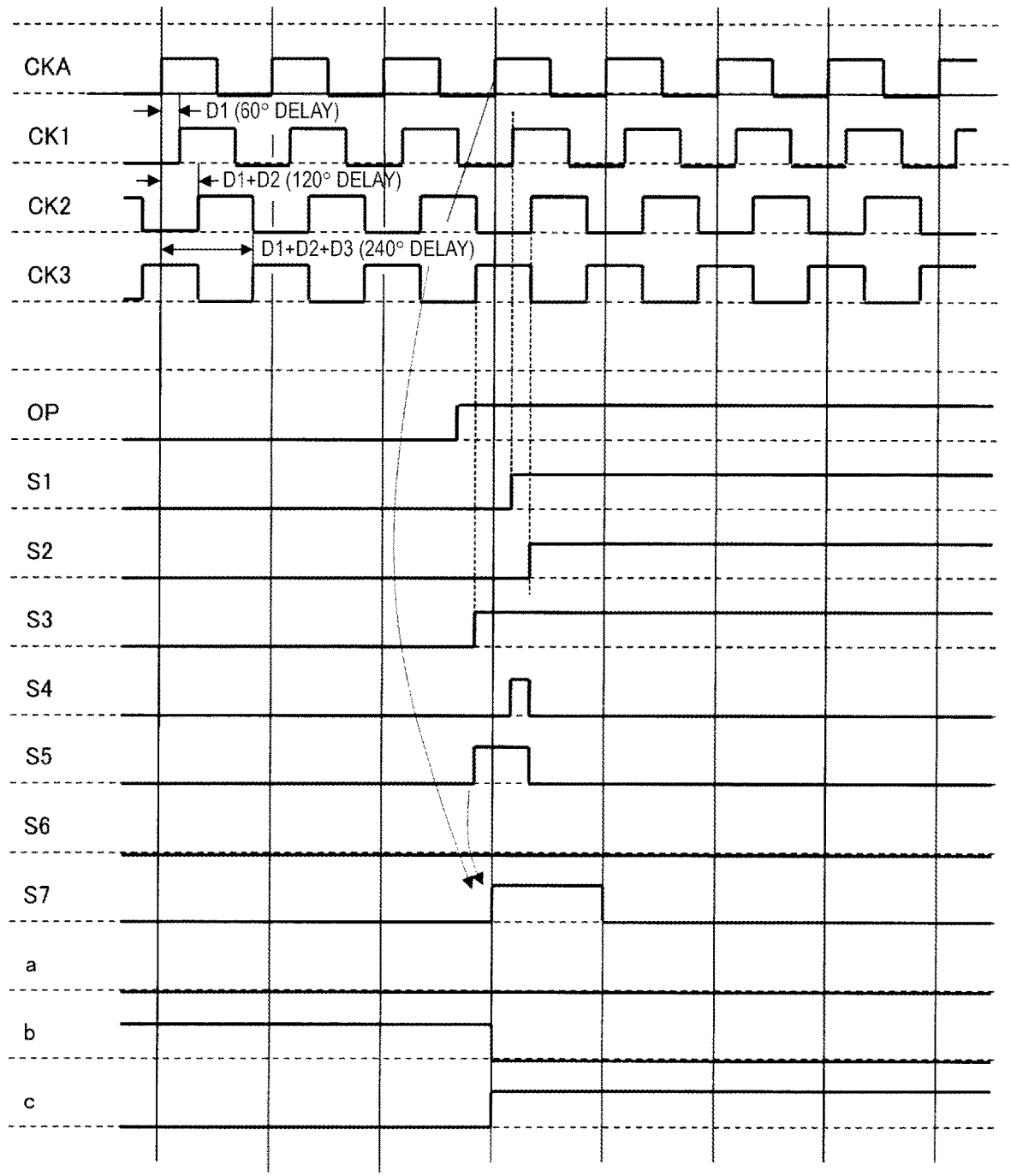
(TIMING CHART OF CASE WHERE THERE IS EDGE IN WINDOW W3 (BETWEEN CK2 AND CK3))

[Fig. 10A]
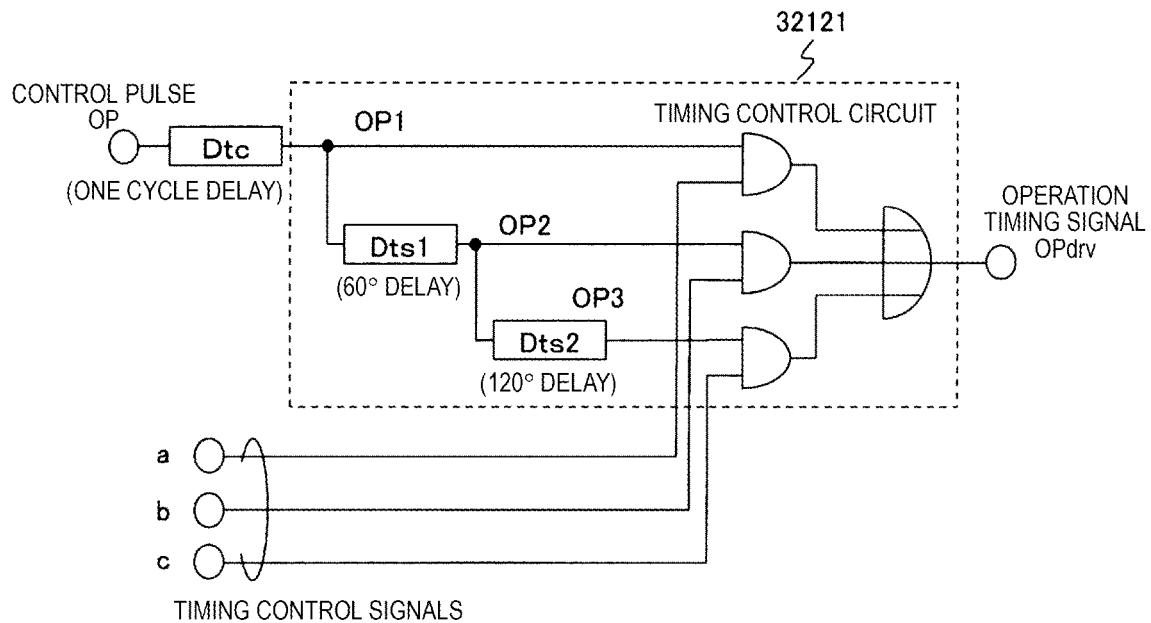
[Fig. 10B]
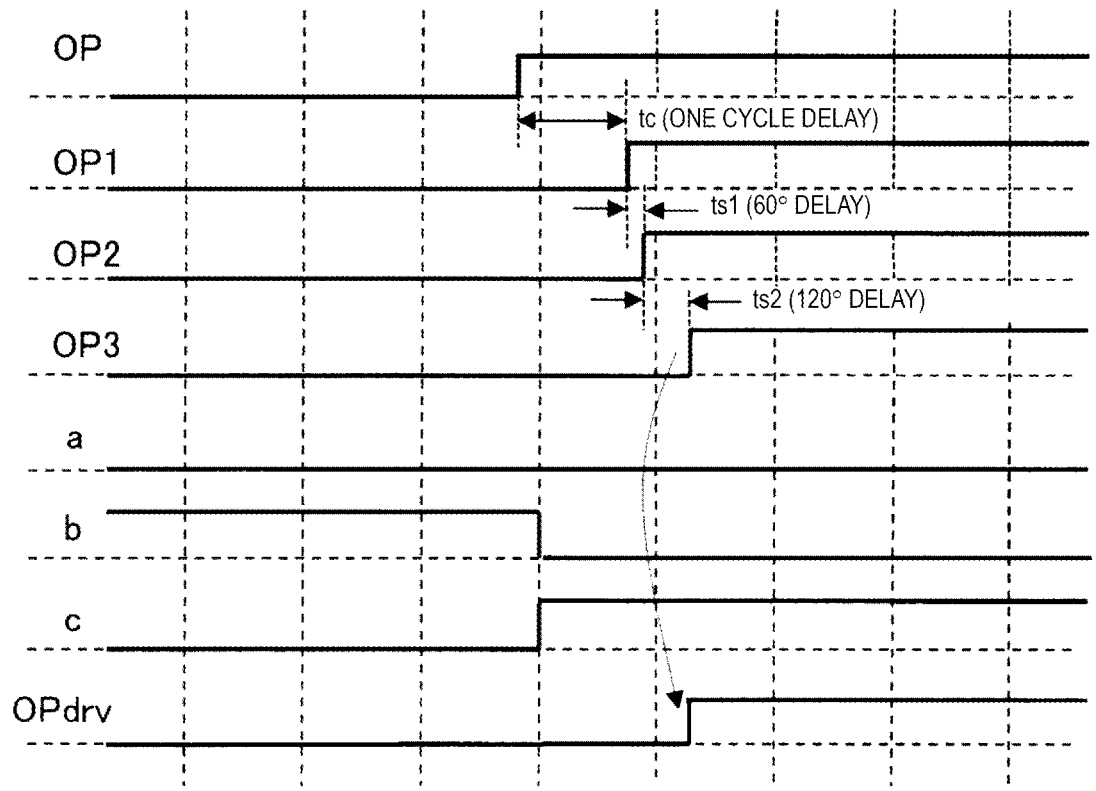

[Fig. 11A]
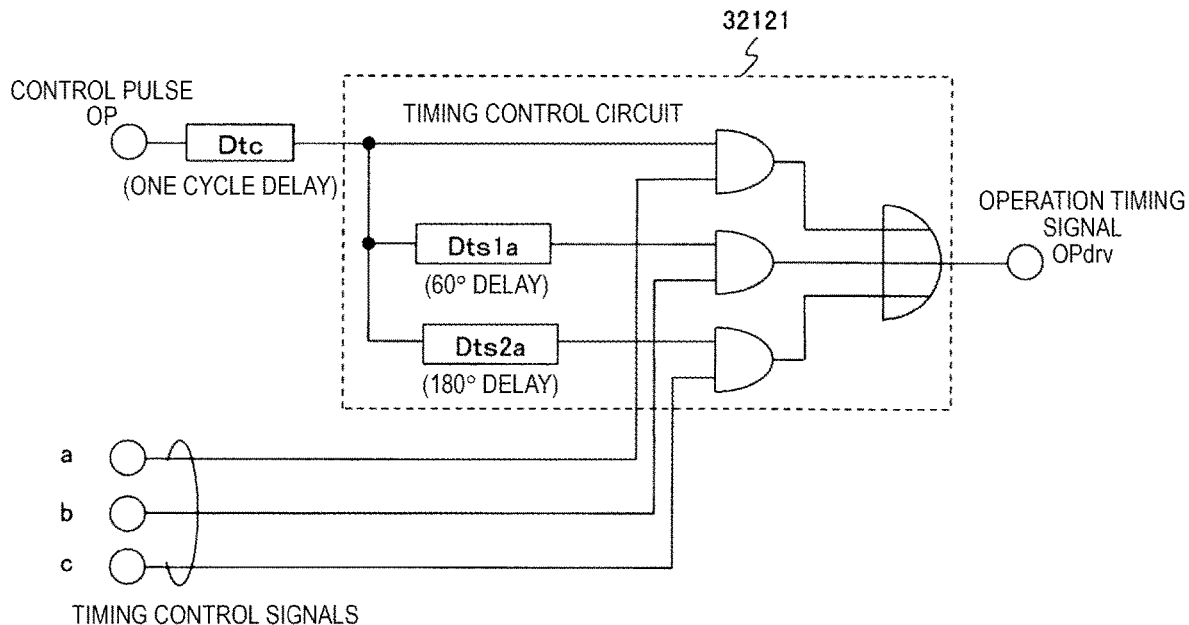
[Fig. 11B]
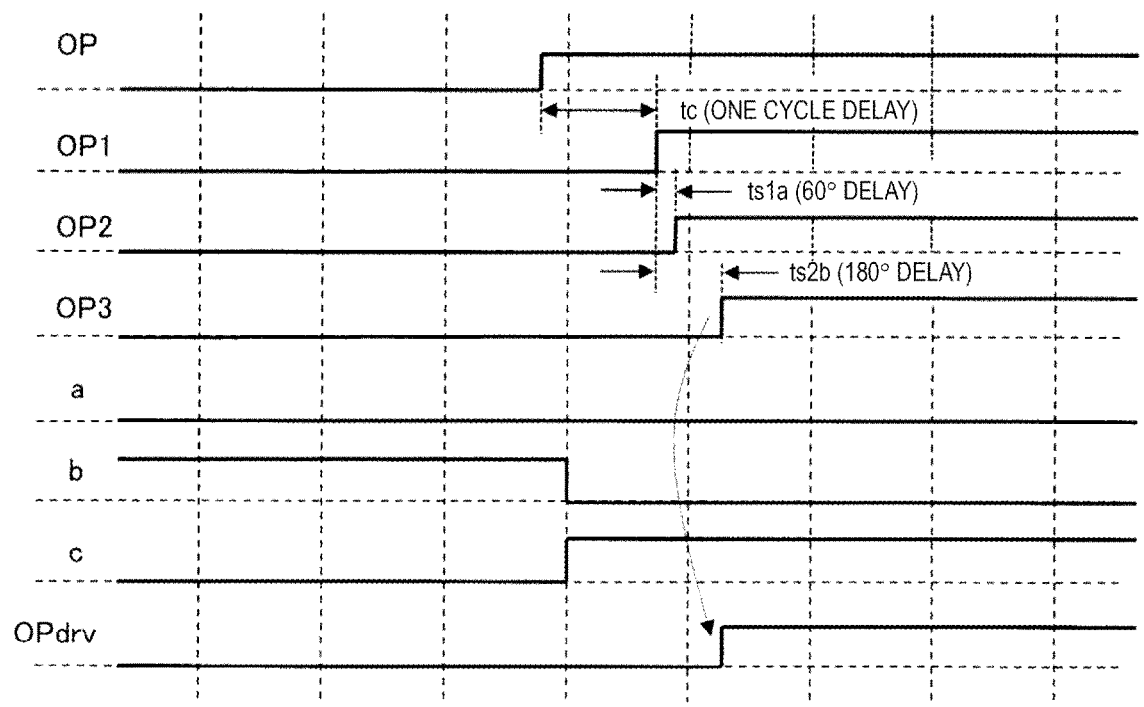

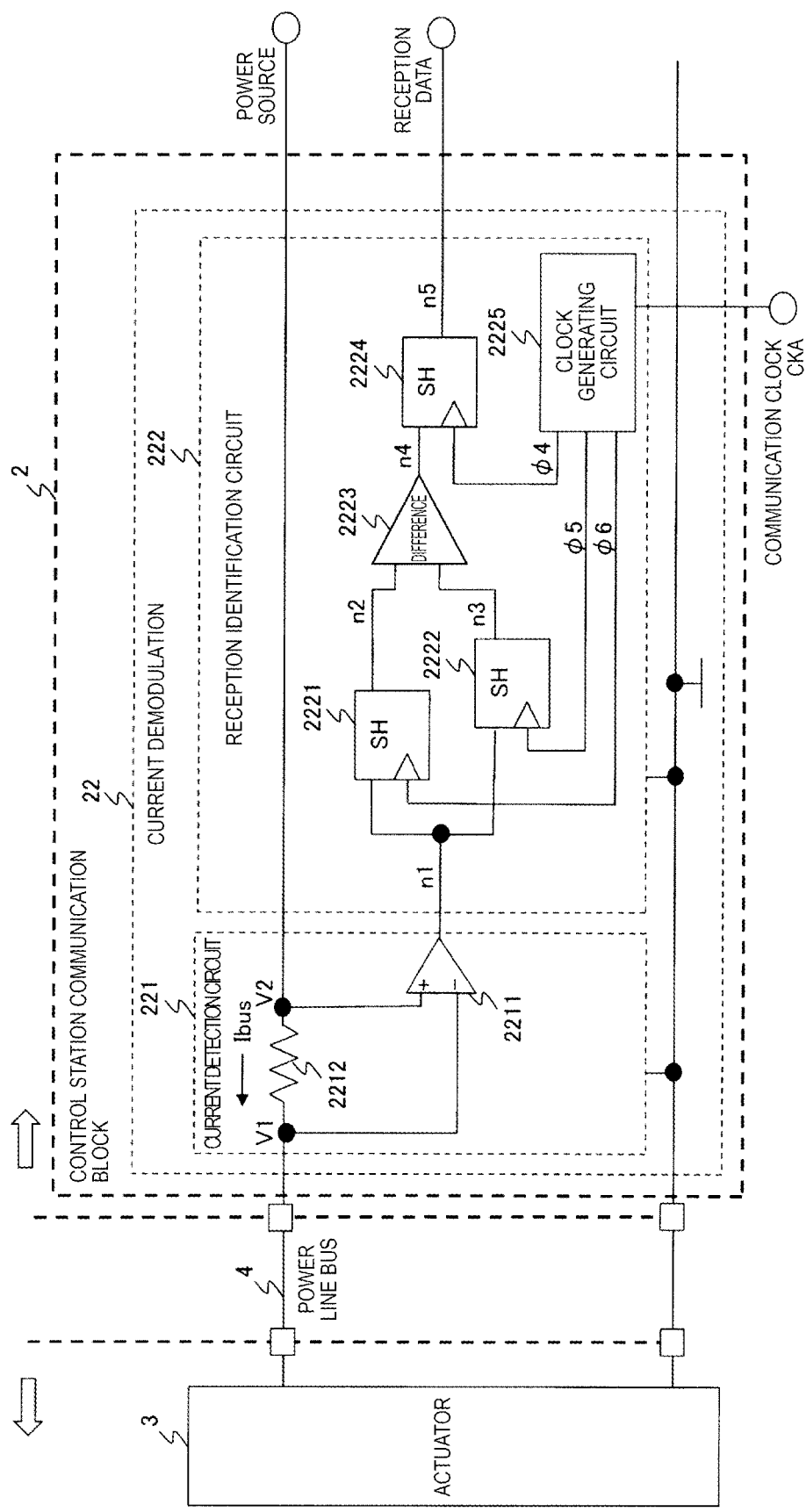
[Fig. 12]

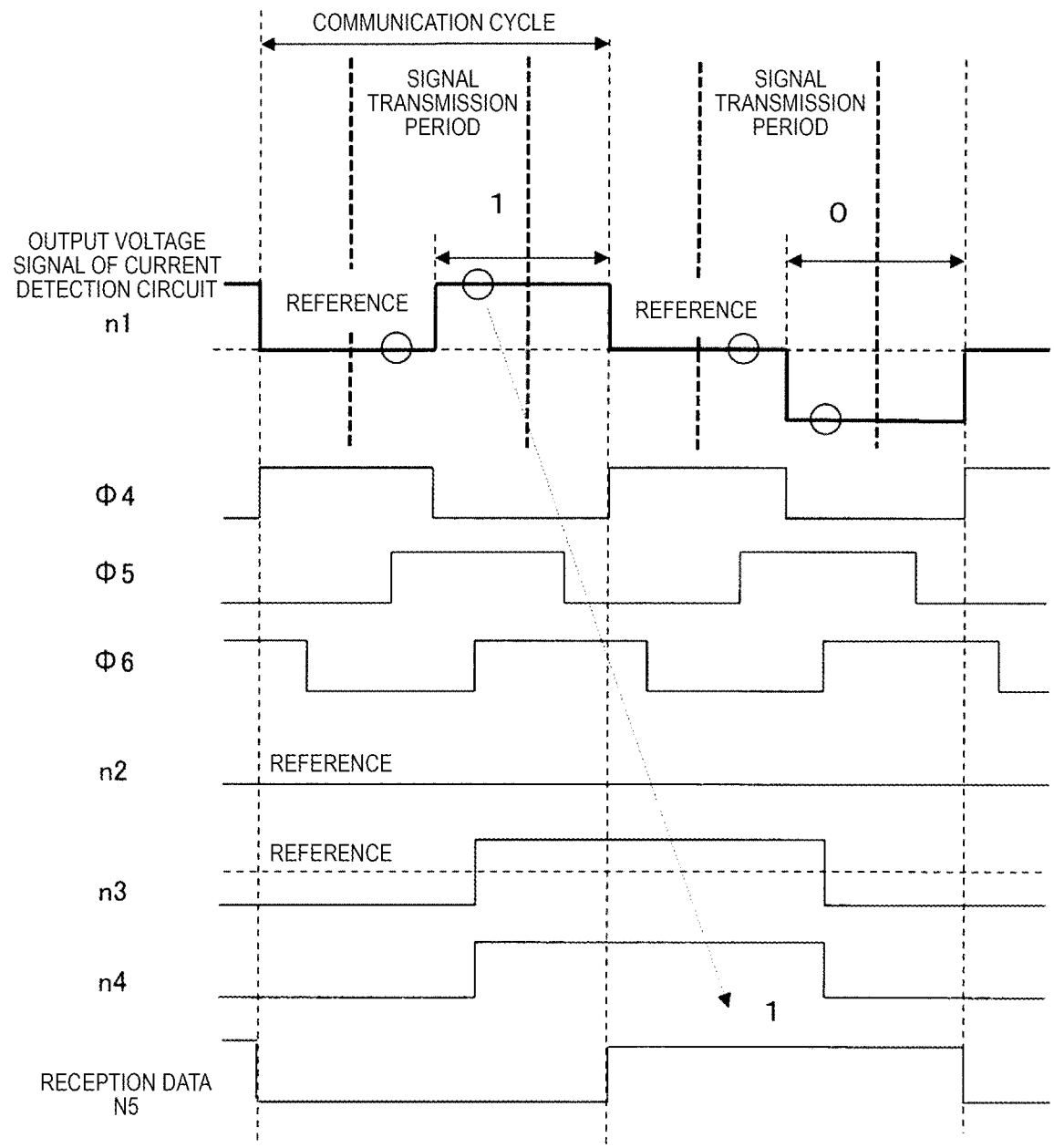
[Fig. 13]

[Fig. 14]
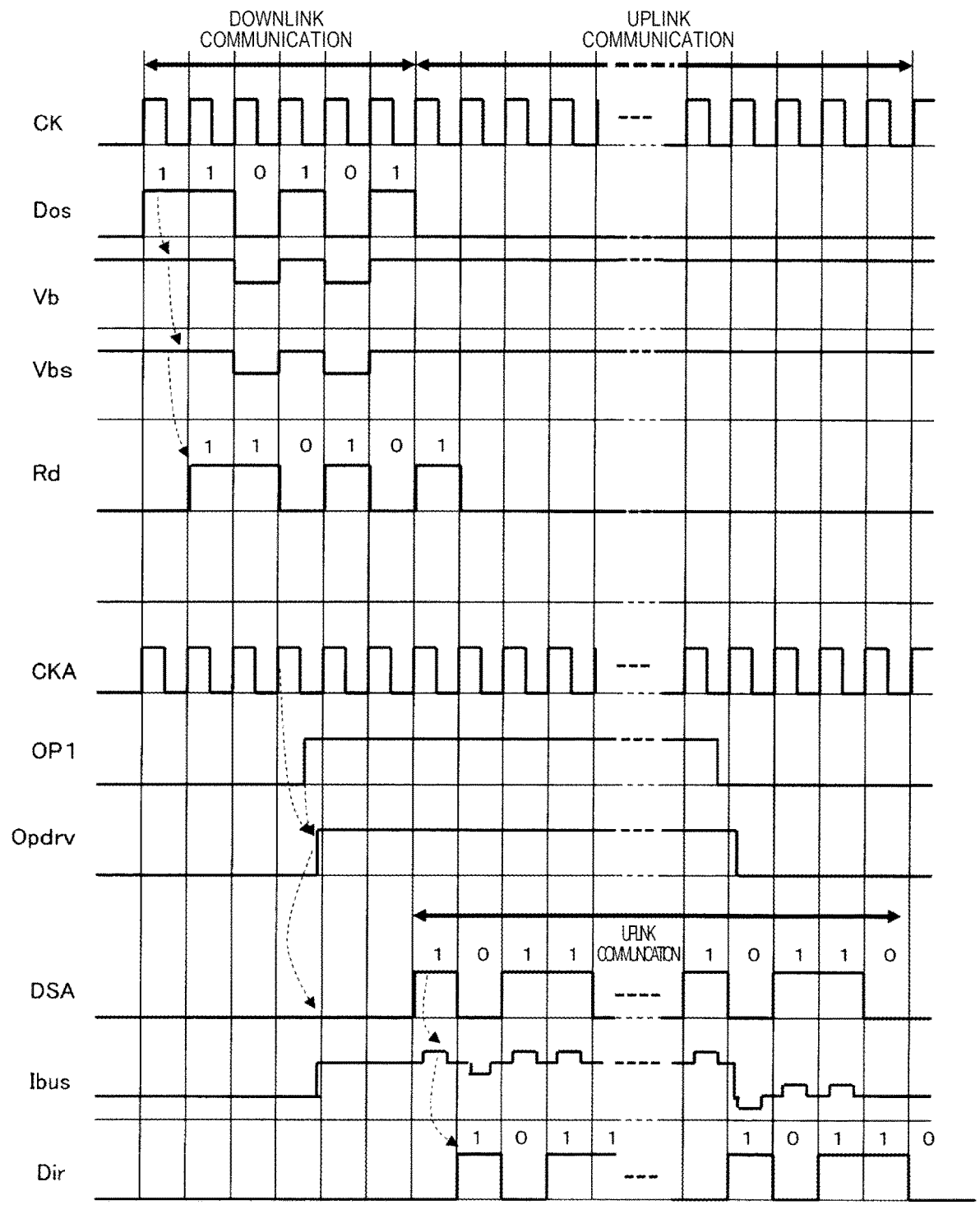

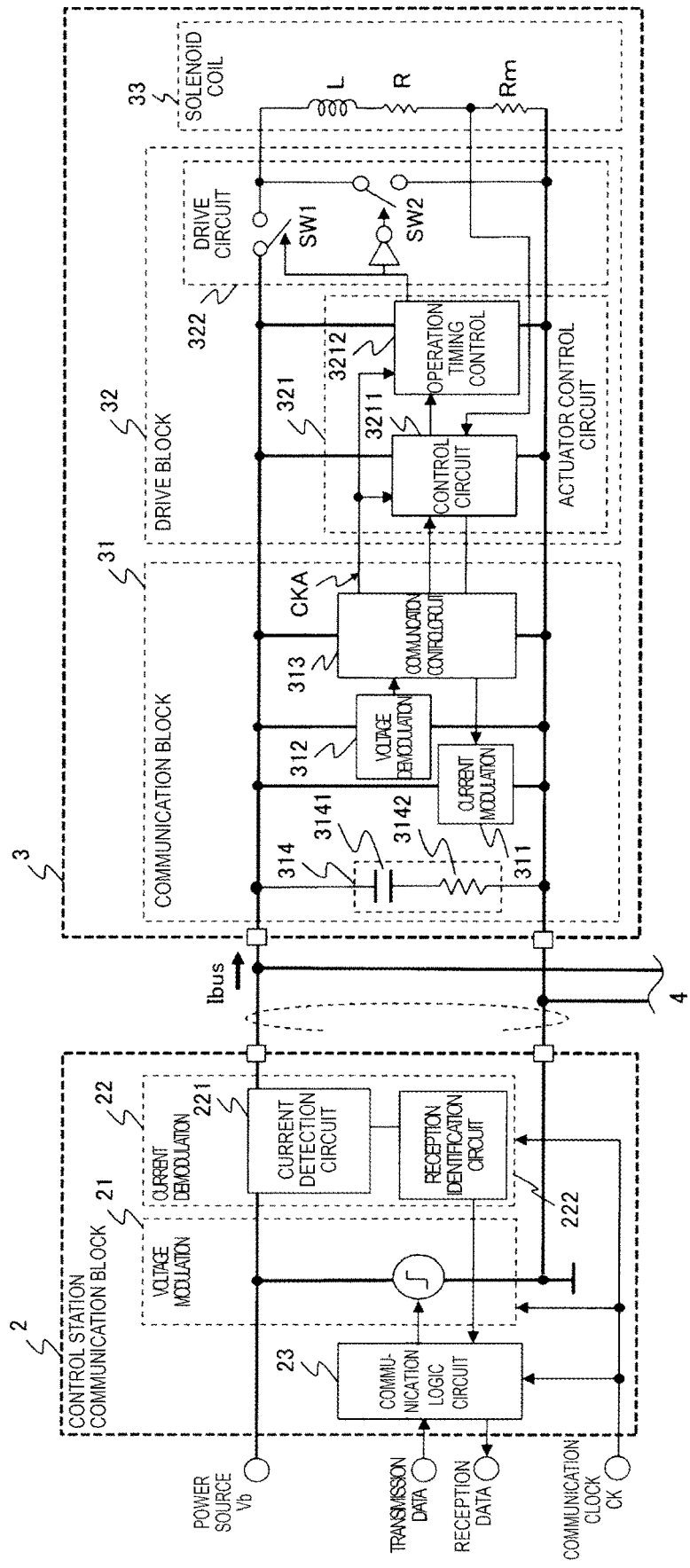
[Fig. 15]

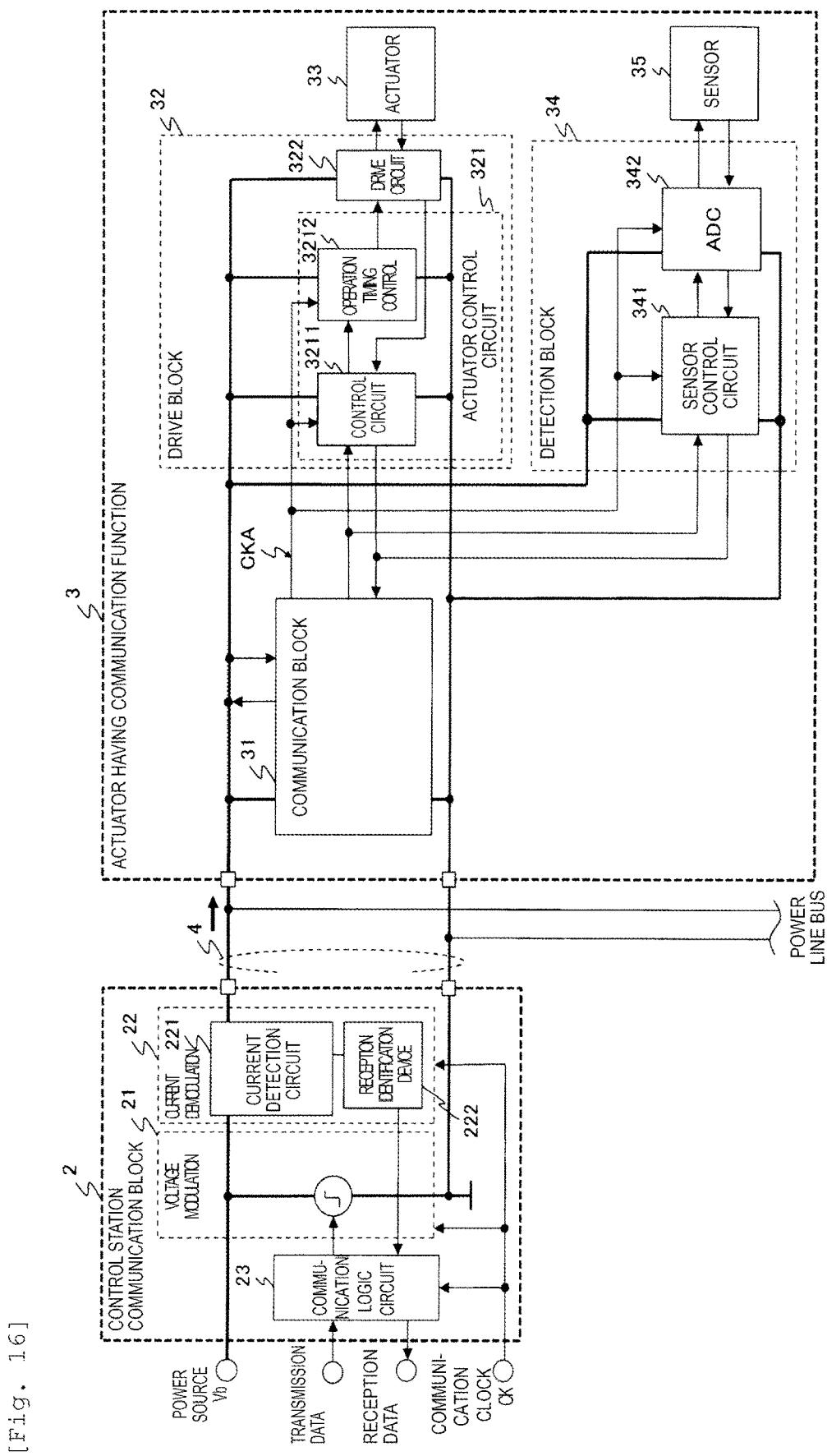
[Fig. 16]

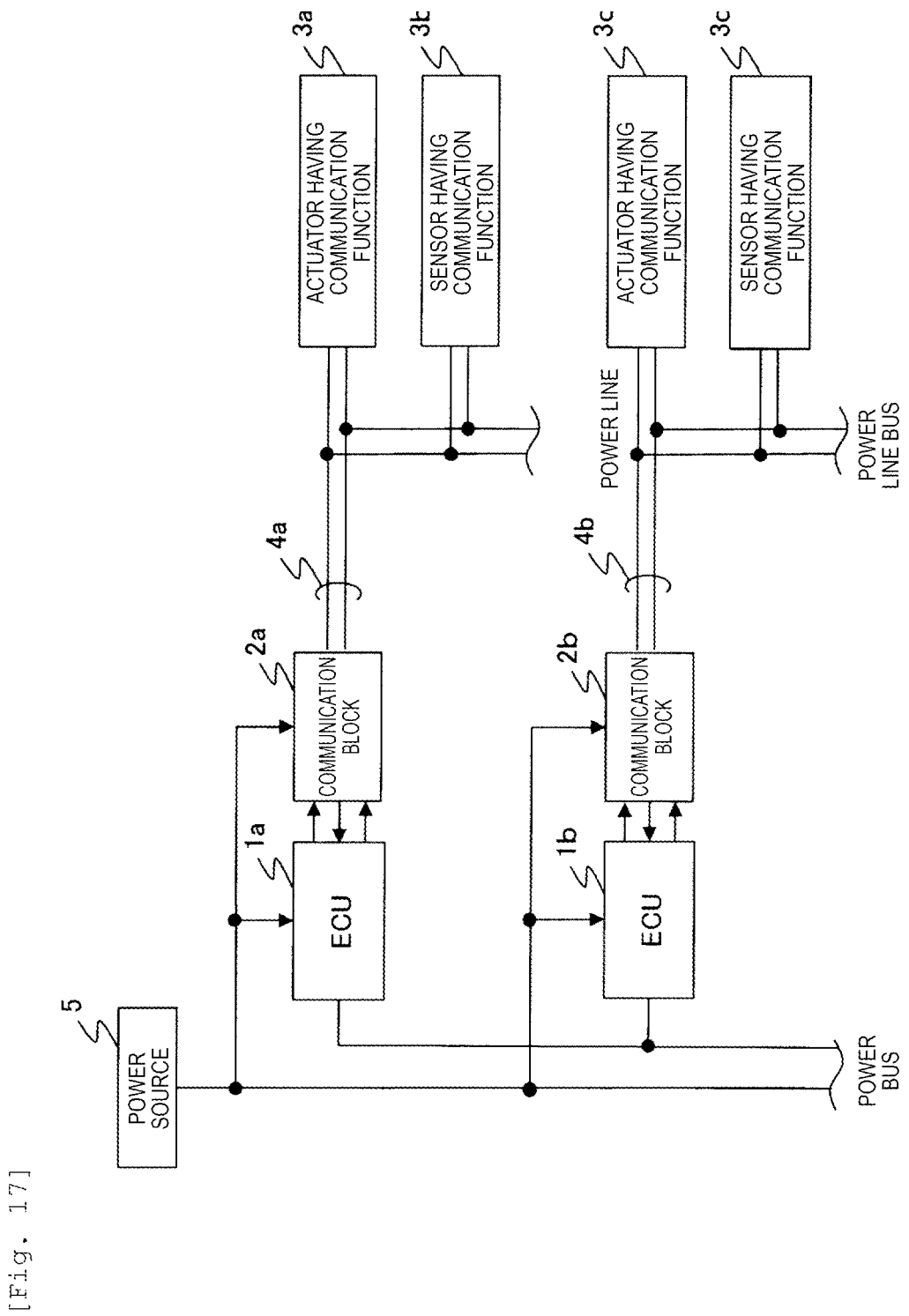
[Fig. 17]

POWER LINE COMMUNICATION APPARATUS AND ELECTRONIC CONTROL APPARATUS INCLUDING POWER LINE COMMUNICATION APPARATUS

TECHNICAL FIELD

The present invention relates to a power line communication apparatus using a power line of a DC power source and an electronic control apparatus including the power line communication apparatus.

BACKGROUND ART

Recently, in automobiles, as higher accuracy and higher functionality of vehicle control by an electronic control unit (ECU), in order to acquire various types of vehicle information (including peripheral information of vehicle) and control various parts of the vehicle, a large number of sensors or actuators are provided, and the number of communication lines between the sensors or the actuators and the ECU increases significantly. An application of the power line communication apparatus using the power line of the DC power source as the communication lines is disclosed in PTL 1. In PTL 1, a communication phase and a power supply phase are provided for the use of the power line and the power line is used for any one of communication and power supplying for each phase.

CITATION LIST

Patent Literature

PTL 1: JP-A-2007-306209

SUMMARY OF INVENTION

Technical Problem

In PTL 1, a communication phase and a power supply phase are provided for a power line, and communication is not influenced by power supplying. However, it may not be possible to intermittently turn off the power supplying from the DC power source used for driving of an actuator for a phase. For example, in a case where a solenoid coil or a motor controlled in a pulse width modulation (PWM) manner is controlled as the actuator, it is not possible to intermittently turn off the power supplying from the DC power source. When intermittently turning off the power supplying, it is not possible to achieve a desired control of the actuator. In a case of the actuator controlled in the PWM manner, it is necessary to supply an average current of a current controlled in the PWM manner to the actuator as a desired driving current, but it becomes difficult to control the desired driving current by intermittently turning off the power supplying.

Meanwhile, since the current of the power line changes due to change in the current for driving the actuator, the change has an effect of causing, for example, an error in a case of communicating using the power line.

Therefore, in a situation where the power supplying to the power line from the DC power source cannot be intermittently turned off depending on a phase, it is desirable to realize the communication using the power line in which the power supplying continues.

Solution to Problem

A disclosed power line communication apparatus includes a drive block that includes an actuator control circuit that generates a control pulse for controlling an actuator and controls a transition timing of the control pulse during an operation period set within a communication cycle by a communication clock, and a drive circuit controls a driving current of the actuator supplied from a DC power source through a power line based on the control pulse in which the transition timing is controlled, and a communication block that generates the communication clock, and modulates a current flowing through the power line in response to the data to be transmitted during a signal transmission period that is set within the communication cycle and is different from the operation period.

In addition, an electronic control apparatus including the power line communication apparatus is disclosed.

Advantageous Effects of Invention

According to a power line communication apparatus and an electronic control apparatus to be disclosed, in a situation (turning off of power supplying) where power supplying to a power line from a DC power source cannot be intermittently turned off depending on a phase, it is possible to realize communication using the power line.

BRIEF DESCRIPTION OF DRAWINGS

FIG. 1 is a configuration example of an electronic control apparatus including a power line communication apparatus.

FIG. 2 is a diagram illustrating a control operation of an operation timing control circuit.

FIG. 3 is a current waveform diagram illustrating an operation of a current modulation circuit.

FIG. 4 is a diagram indicating an identification method for identifying a code by a reception identification circuit.

FIG. 5 is a configuration example of an electronic control apparatus including a power line communication apparatus of Example 2.

FIG. 6 is a configuration example of an actuator control circuit.

FIG. 7 is a configuration example of an operation timing control circuit.

FIG. 8 is a timing chart indicating of an operation of the operation timing control circuit.

FIG. 9A is a specific example of a driving current transition time detection circuit.

FIG. 9B is an example of a timing chart illustrating an operation of the driving current transition time detection circuit.

FIG. 10A is a specific example of a timing control circuit.

FIG. 10B is an example of a timing chart illustrating an operation of the timing control circuit.

FIG. 11A is a specific example of another timing control circuit.

FIG. 11B is an example of a timing chart illustrating an operation of another timing control circuit.

FIG. 12 is a specific example of a current demodulation circuit.

FIG. 13 is a timing chart illustrating an operation of a reception identification circuit.

FIG. 14 is a timing chart outlining communication between a control station communication block 2 and an actuator having a communication function.

FIG. 15 is a configuration example of an electronic control apparatus including a power line communication apparatus of Example 3.

FIG. 16 is a configuration example of an electronic control apparatus including a power line communication apparatus of Example 4.

FIG. 17 is a configuration example of the electronic control apparatus in which a plurality of ECUs are connected to a power source through a bus.

DESCRIPTION OF EMBODIMENTS

As an embodiment, an electronic control device including a power line communication apparatus and a power line communication device including the power line communication apparatus are disclosed through several practical examples. The power line communication apparatus includes an actuator control circuit that generates a control pulse of controlling an actuator and controls a transition timing of the control pulse during an operation period set during a communication cycle by a communication block, a drive block including a drive circuit that controls a driving current of the actuator supplied from a DC power source through a power line based on the control pulse in which the transition timing is controlled, and a communication block that generates the communication block and demodulates a current flowing through the power line in response to data to be transmitted during a signal transmission period different from the operation period, which is set during the communication cycle.

With such a configuration, it is possible to realize communication using the power line in a situation where power supplying from the DC power source to the power line is continued.

In the description of the embodiment, the term of block is used in order to avoid the complexity of terminology according to a nested configuration in which one circuit includes another circuit, but there is no meaning to use it.

Example 1

FIG. 1 is a configuration example of the electronic control apparatus including the power line communication apparatus. The electronic control apparatus includes an electronic control unit (ECU) 1, a control station communication block 2, an actuator 3 having a communication function, a power line bus 4, and a power source (DC power source) 5. The ECU 1 and the actuator 3 communicate with each other by the control station communication block 2 and a communication block 31 of the actuator 3 having the communication function through the power line communication apparatus.

The control station communication block 2 includes a communication logic circuit 23, a voltage modulation circuit 21, and a current demodulation circuit 22. Each circuit is operated based on a communication block CK from the ECU 1. The communication logic circuit 23 is interfaced with the ECU 1, and detects encoding/decoding of communication data and a communication error with the actuator 3. The communication logic circuit 23 outputs transmission data (control command for controlling actuator or the like) from the ECU 1 as input data Dos of the voltage modulation circuit 21. The voltage modulation circuit 21 converts input data Dos into a voltage signal, and overlaps the converted data with the power line bus 4. The overlapping the voltage signal with the power line bus 4 is to transmit the signal to the communication block 31.

The current demodulation circuit 22 includes a current detection circuit 221 and a reception identification circuit 222. The current detection circuit 221 detects the current flowing through the power line bus 4, and converts the detected current into the voltage signal. The reception identification circuit 222 identifies the reception data Dir from the voltage signal output from the current detection circuit 221, and outputs the identified reception data to the communication logic circuit 23.

Although not illustrated, since there is no response from the actuator 3 during the ECU 1 transmits the message in a case where a message response method in which the actuator 3 responses to a message (transmission data) from the ECU 1 to the actuator 3 in the communication between the ECU 1 and the actuator 3, it is desirable that the ECU 1 controls the current detection circuit 221 so as not to be operated during that time.

The actuator 3 having the communication function includes the communication block 31, a drive block 32, and an actuator 33. The communication block 31 includes a current modulation circuit 311 that converts (modulates current Ibus flowing through a power line bus 4 in response to transmission data) the transmission data transmitted from the drive block 32 to the ECU 1 into a current signal, a voltage demodulation circuit 312 that demodulates data Rd from the voltage signal of the power line bus 4, and a communication control circuit 313 controls communication with the control station communication block 2 and generates a communication clock CKA. The drive block 32 includes an actuator control circuit 321 that controls an operation of the actuator 33 and a drive circuit 322 that drives the actuator 33. The actuator control circuit 321 is driven and controlled by a control circuit 3211 and an operation timing control circuit 3212 of which operations are synchronized with the communication clock CKA of the communication control circuit 313. The actuator 33 is driven and controlled by the drive circuit 322 controlled by the actuator control circuit 321 of which an operation is synchronized with the communication clock CKA.

Current communication from the actuator 3 having the communication function to the control station communication block 2 will be described.

FIG. 2 is a diagram illustrating a control operation of the operation timing control circuit 3212. In a case where the transition timing of the driving current Idrv (rising from turning off (low) to turning on (high) of driving current Idrv or transition timing of falling from turning on to turning off to drive circuit 322) is during (1) the signal transmission period provided during the communication cycle (one period of communication clock CKA by communication control circuit 313), the operation timing control circuit 3212 moves the transition timing in (2) a transition operation period (in the drawing, operation period) provided before and after the signal transmission period. With this timing control, since the transition of the driving current does not occur during (1) the signal transmission period of the communication cycle, no current fluctuation occurs in the power line bus current Ibus.

In FIG. 2, a rising timing of the driving current Idrv to be shifted forward in time is illustrated, but as will be described below, it is controlled to be relatively shifted before with respect to the signal transmission period. In addition, by shifting the transition timing of the driving current Idrv at a particle size less than the signal transmission period, although the current (average current of driving current Idrv) controlling the actuator 33 fluctuates, since a frequency and a communication frequency at the time of fluctuating the driving current Idrv are generally different from each other by three or four orders of magnitude, the fluctuation can be neglected.

FIG. 3 is a current waveform diagram illustrating an operation of the current modulation circuit 311. In modulation by the current modulation circuit 311, a transition direction of current changes with respect to a predetermined reference current according to a code of the transmission data. Specifically, the current modulation circuit 311 generates a transmission current waveform causing to be generated positive-side transition (+ΔIp) in a transmission current waveform with respect to the predetermined reference current when the code of data DSA acquired from the actuator control circuit 321 through the communication control circuit 313 is "1" during the signal transmission period, and causing to be negative transition (−ΔIp) in the transmission current waveform with respect to the predetermined reference current when the code of the data DSA is "0", and overlaps the transmission current waveform with the power line bus current Ibus.

In the control station communication block 2, the current detection circuit 221 detects the current Ibus of the power line bus 4, and converts the detected result into a voltage waveform similar to a power line bus current waveform (current waveform causes to transition to positive-side or negative-side with respect to predetermined reference current). Therefore, an output waveform of the current detection circuit 221 becomes the voltage waveform such as the current waveform illustrated in FIG. 3.

FIG. 4 is a diagram illustrating an identification method for identifying the code from the output waveform of the current detection circuit 221 by the reception identification circuit 222. The reception identification circuit 222 identifies the code of the reception data Dir as "1" in a case where a direction in which a reception voltage waveform (output waveform of current detection circuit 221) transitions during the signal transmission period causes to transition (ΔVp>0) to the positive-side with respect to a predetermined reference voltage, and as "0" in a case where the direction causes to transition (ΔVp<0) to the negative-side with respect to the predetermined reference voltage. From the viewpoint of the reception identification circuit 222, the signal transmission period can be mentioned to be a signal reception period, but the term is used unified here.

According to this example, in the situation where the power supplying from the DC power source to the power line is continued, it is possible to realize the communication using the power line. Specifically, by moving the transition timing of the driving current Idrv in the actuator 33 to the operation period provided during the communication cycle, is possible to prevent current fluctuation due to drive control of the actuator 33 in the signal transmission period. As a result, the current communication by the actuator 3 having the communication function and the control station communication block 2 in the power line communication apparatus does not cause the communication error by exchanging data during the communication period.

Example 2

FIG. 5 is a configuration example of the electronic control apparatus including the power line communication apparatus of the present example. However, the ECU 1 and the power source 5 are not illustrated. The present example is an electronic control apparatus in which a solenoid coil is applied to the actuator 33 of Example 1. The drive circuit 322 includes two switches SW1 and SW2. These two switches are complementarily operated by an operation timing signal OPdrv from the operation timing control circuit 3212, when the switch SW1 is turned on, the switch SW2 is turned off, and when the switch SW1 is turned off, the switch SW2 is turned on. The average current of the driving current Idrv flowing through the solenoid coil 33 is controlled by a time width in which the switch SW1 is turned, that is, by a pulse width of the operation timing signal OPdrv of turning on the switch SW1 with respect to a period of turning on/off of the switch SW1. That is, the driving current Idrv is controlled by the operation timing signal OPdrv in a pulse width modulation (PWM) manner. The operation timing signal OPdrv of turning on the switch SW1 causes the transition timing of the control pulse (OP) generated by the control circuit 3211 of the actuator control circuit 321 to be controlled during the operation period in the communication cycle as described in Example 1.

The frequency of the control pulse (OP) is several hundred Hz (turning on/off switching frequency of switch SW1). Therefore, the driving current Idrv of the solenoid coil 33 fluctuates in several hundred Hz. Meanwhile, the communication frequency (communication clocks CK and CKA) of several hundred kHz to several MHz is used in the communication between the ECU 1 and the actuator 3 having the communication function. In this manner, the frequency of the control pulse (OP) and the communication frequency are different from each other by three to four orders of magnitude. Therefore, the fluctuation of the average current of the driving current Idrv due to the control to the operation period within the communication cycle of the transition timing of the control pulse (OP) can be neglected.

FIG. 6 is a configuration example of the actuator control circuit 321 focused on the output of the control pulse OP. The actuator control circuit 321 includes the control circuit 3211 and the operation timing control circuit 3212. The control circuit 3211 includes a current setting circuit 32111 that stores a set current value corresponding to a command value (control command) from the ECU 1, a current monitoring circuit 32115 that monitors the current value flowing through the solenoid coil 33, a difference circuit 32112 that outputs difference between the set current value and the current value flowing through the solenoid coil (current monitored result) monitored by the current monitoring circuit 32115, a triangular wave generating circuit 32114 that generates a PWM control pulse, and a difference circuit 32113. The control circuit 3211 outputs the control pulse OP of the pulse width corresponding to a difference output of the difference circuit 32112, and controls to coincide the set current value and the current monitored result. That is, when the set current value and the current value of the solenoid coil 33 coincide with each other, the control circuit 3211 outputs the control pulse OP of a predetermined pulse width, and when the set current value is larger than the current value, the control circuit 3211 outputs the control pulse OP of the pulse width larger than the predetermined pulse width.

Meanwhile, although illustration is omitted, the control circuit 3211 transmits the transmission data to the control station communication block 2. The transmission data is control state data of the actuator 33, and, for example, the current monitored result. The transmission data is in synchronization with the communication clock CKA, and output from the control circuit 3211 to the communication control circuit 313.

FIG. 7 is a configuration example of the operation timing control circuit 3212. FIG. 8 is a timing chart illustrating an operation of the operation timing control circuit 3212. The operation timing control circuit 3212 includes a timing control circuit 32121 and a driving current transition time detection circuit 32122. The timing control circuit 32121 receives the control pulse OP from the control circuit 3211 and the timing control signals a, b, and c from the driving current transition time detection circuit 32122, and outputs an operation timing signal Opdrv. The driving current transition time detection circuit 32122 receives the control pulse OP and the communication clock CKA, and outputs the timing control signals a, b, and c to the timing control circuit 32121.

FIG. 8 is a timing chart illustrating an operation of the operation timing control circuit 3212. The driving current transition time detection circuit 32122 uses the communication clock CKA as a basic clock CKA ($\varphi 0$), clock CK1 delayed by $\varphi 1$ (for example, 60°) from the CKA, clock CK2 delayed by $\varphi 2$ (for example, 120°) from the CKA, and clock CK3 delayed by $\varphi 3$ (for example, 240°) from the CKA. Each clock of CK1 to CK3 is generated from the communication clock CKA by the driving current transition time detection circuit 32122, as described below.

One cycle of the communication clock CKA is called as the communication cycle as described above. The communication cycle is divided into four windows W1 to W4. The window W1 is between (1) a rising time of the CKA and (2) a rising time of the CK1. The window W2 is between (2) the rising time of the CK1 and (3) the rising time of the CK2. The window W3 is between (3) the rising time of the CK2 to (4) the rising time of the CK3. The window W4 is between (4) the rising time of the CK3 and (5) the rising time of the next cycle of the CKA (end time of communication cycle).

The driving current transition time detection circuit 32122 detects a level (high or low) of the control pulse OP (input from difference circuit 32113) of start and end times (1) to (5) of each window. In a case where there is a difference between the levels of the control pulse OP in the start time and the end time of the window (difference exceeds a predetermined threshold), a switching edge (rising or falling edge) of the control pulse OP is present.

If the switching edge is present in the window W2, the driving current transition time detection circuit 32122 outputs a high level "1" as a timing control signal a, if the switching edge is present in the window W3, the driving current transition time detection circuit 32122 outputs the high level "1" as a timing control signal c, and if the switching edge is not present in the windows W2 and W3, the driving current transition time detection circuit 32122 outputs the high level "1" as a timing control signal b.

FIG. 9A is a specific example of the driving current transition time detection circuit 32122. FIG. 9B a timing chart illustrating a case where the switching edge of the control pulse OP is present in the window W3 as an example in the driving current transition time detection circuit 32122. In FIG. 9A, D1, D2, and D3 are delay circuits for generating clocks CK1 to CK3 having delay times from the communication clock CKA, respectively. The delay circuit D1 has a delay time D1 corresponding to the above-described phase $\varphi 1$. The delay circuit D2 has a delay time D2 corresponding to the above-described phase ($\varphi 2-\varphi 1$). The delay circuit D3 has a delay time D3 corresponding to the above-described phase ($\varphi 3-\varphi 2-\varphi 1$). In other words, as illustrated in FIG. 9B, the delay time D1 is a delay time of the CK1 with respect to the CKA, the delay time D2 is a delay time of the CK2 with respect to the CK1, and the delay time D3 is a delay time of the CK3 with respect to the CK2.

Latch circuits (in the drawing, reference number is omitted) output signals S1, S2, and S3 latched with the control pulse OP at rising edges of the CK1, the CK2, and CK3, respectively. A sample and hold circuit SH holds an output S4 of an exclusive OR circuit of the signals S1 and S2 and an output S5 of the exclusive OR circuit of signals S2 and S3, and outputs the held output as signals S6 and S7. The output S4 of the exclusive OR circuit indicates the presence of the switching edge of the control pulse OP in the window W2 and the output S5 of the exclusive OR circuit indicates the presence of the switching edge of the control pulse OP in the window W3. For example, as illustrated in FIG. 9B, the output S5 of the exclusive OR circuit is held by the sample and hold circuit SH, and outputs "1" (high) as the timing control signal c.

FIG. 10A is a specific example of the timing control circuit 32121. FIG. 10B is a timing chart exemplifying a case where the switching edge of the control pulse OP is present in the window W3 of the timing control circuit 32121. When the timing control signal a of the driving current transition time detection circuit 32122 is "1", the timing control circuit 32121 controls a phase of the control pulse OP to be advanced as compared with a case where the timing control signal b is "1", and when the timing control signal c is "1", as compared with the case where the timing control signal b is "1", the timing control circuit 32121 controls the phase of the control pulse OP to be delayed, and outputs the delayed phase as the operation timing signal OPdrv.

A delayed time tc of a delay circuit Dtc is set to one cycle time (communication cycle) of the communication clock CKA. The delayed time ts1 of a delay circuit Dts1 is set to a window width of the window W2. The delayed time ts2 of a delay circuit Dts2 is set to a window width of the window W3. With this setting, the control pulse OP acquires OP1 delayed by the delayed time tc, OP2 delayed by the delayed time tc+ts1, and OP3 delayed by the delayed time tc+ts1+ts2.

When the timing control signal a is "1", the operation timing signal OPdrv is advanced by the delayed time ts1, as compared with a case where the timing control signal b is "1". When the timing control signal c is "1", the operation timing signal OPdrv is delayed by the delayed time ts2 as compared with a case where the timing control signal b is "1". Therefore, the switching edge of the control pulse OP moves to the above-described operation period, and does not present in the signal transmission period.

For the control pulse OP, since the OP1 having a delay corresponding to a time the communication cycle by the delay circuit Dtc is output as the operation timing signal OPdrv, the transition timing of the driving current Idrv is shifted forward as if it is temporally shifted in FIG. 2 of Example 1. However, it is controlled so as to be relatively shifted before the next signal transmission period.

FIG. 11A is another specific example of the timing control circuit 32121. FIG. 11B is a timing chart exemplifying a case where the switching edge of the control pulse OP is present in the window W3 of another timing control circuit 32121. In this case, the operation timing signal OPdrv is advanced by the delayed time ts1$a$ when a is "1" and the signal delayed by the delayed time ts2$a$–ts1$a$ is output when c is "1" in a case where the timing control signal b is "1". Also in this configuration, the delayed time ts1$a$ is set to the window width of the window W2 and difference between the delayed time Ts1$a$ and the delayed time Ts2$a$ is set to the window width of the window W3 thereby operating similarly to the timing control circuit 32121 of FIG. 11A. By combining descriptions of FIG. 10A and FIG. 10B, FIG. 11A and FIG. 11B can be understood, so the detailed description will be omitted.

FIG. 12 is a specific example of the current demodulation circuit 22. As described above, the current demodulation circuit 22 includes the current detection circuit 221 and the reception identification circuit 222. The current detection circuit 221 includes a resistor 2212 and a differential amplifier 2211. The differential amplifier 2211 amplifies voltage drop due to the resistor 2212 of the power line bus current Ibus, that is, a voltage difference (V2–V1) of both ends of the resistor 2212, and outputs a voltage signal n1. The reception identification circuit 222 includes three sample and hold circuits (SH) 2221, 2222, and 2224, a difference circuit 2223, and a clock generating circuit 2225. The reception identification circuit 222 identifies the output voltage signal n1 of the current detection circuit 221, and converts the identified result into the reception data.

FIG. 13 is a timing chart illustrating an operation of the reception identification circuit 222. As described in the drawing, in the output voltage signal n1 of the current detection circuit 221, the voltage signals n2 and n3 are held in the clocks of two phases φ5 and φ6 during the signal transmission period in the sample and hold circuits 2221 and 2222. The reception identification circuit 222 acquires the difference n4 of the voltage signal between the sample and hold circuits 2221 and 2222 by the difference circuit 2223, synchronizes a difference voltage signal n4 in the clock of the phase φ4, and outputs reception data n5 (Dir). Therefore, the reception identification circuit 222 identifies the reception data by synchronizing the communication clock (phase φ4) with data of the signal transmission period.

Although not illustrated, the communication clock CKA of the clock generating circuit 2225 of the reception identification circuit 222 generates the reception data n5 through a phase locked loop (PLL) and phase adjustment (delay).

FIG. 14 is a timing chart outlining communication between the control station communication block 2 and the actuator 3 having the communication function. If the communication method is a message response method in which the actuator 3 responds to the message (transmission data) from the ECU 1 to the actuator 3, uplink communication from the actuator 3 having the communication function to the control station communication block 2 occurs corresponding to downlink communication from the control station communication block 2 to the actuator 3 having the communication function.

In the downlink communication, in the voltage modulation circuit 21, the transmission data Dos is processed in a voltage modulation manner in synchronization with the communication clock CK from the ECU 1, overlapped with a power source voltage Vb, and is input to the communication block 31 as Vbus. In the communication block 31, the voltage demodulation circuit 312 performs voltage demodulation on the Vbus, and converts the Vbus into the data Rd. The data Rd is output to the drive block 32 through the communication control circuit 313.

Meanwhile, the uplink communication is the current communication in synchronization with the communication clock CKA generated by the communication control circuit 313. The communication control circuit 313 outputs the data from the actuator control circuit 321 to the current modulation circuit 311 as the transmission data DSA. The current modulation circuit 311 generates the transmission current waveform with respect to the transmission data DSA, and overlaps the transmission current waveform with the power line bus current Ibus. The code of the transmission current waveform overlapped with the power line bus current Ibus is identified by the current detection circuit 221 and the reception identification circuit 222, and the transmission current waveform is output to the communication logic circuit 23 as the reception data Dir.

At this time, as described in the drawing, since the transition timing of the driving current Idrv corresponding to the control pulse OP that is output of a control circuit is shifted to the operation period in the communication cycle (see FIG. 2) defined by the communication clock CKA by the operation timing signal OPdrv of the operation timing control circuit 3212, the transmission current waveform corresponding to the transmission data DSA is synchronized with the communication clock CKA, and no error occurs.

According to the present example, in the situation where the power supplying from the DC power source to the power line is continued, it is possible to realize communication using the power line. Specifically, the control circuit 3211 controls a PWM control pulse width, and the operation timing control circuit 3212 controls not to occur the transition of the PWM control pulse during the signal transmission period. Therefore, the current communication between the actuator 3 and the control station communication block 2 does not cause to occur the communication error by exchanging data during the communication period.

Example 3

FIG. 15 is a configuration example of the electronic control apparatus including the power line communication apparatus of the present example, and is an example in which the communication block 31 of the actuator 3 having the communication function of Example 1 is replaced with another configuration. The communication block 31 of the present example connects a series circuit (series circuit for preventing ringing) 314 of a capacitor 3141 and a resistor 3142 between two power lines. The series circuit 314 suppresses ringing phenomenon of the power line bus current Ibus occurring by an inductance component of the power line. By suppressing the ringing phenomenon of the power line bus current Ibus by the series circuit 314, it is possible to suppress a malfunction in detection of a rising or falling transition time of the driving current Idrv by the driving current transition time detection circuit 32122.

Since other configurations are the same as those of Example 1, also in the present example, in the situation where the power supplying from the DC power source to the power line is continued it is possible to realize communication using the power line, the communication error does not occur in the current communication between the actuator 3 having the communication function and the control station communication block 2 by exchanging data during the communication period.

Example 4

FIG. 16 is a configuration example of the electronic control apparatus including the power line communication apparatus of the present example, and is a configuration example in which a sensor 35 connected to the detection block 34 which shares the power source Vb with the drive block 32 is included in the actuator 3 having the communication function of Example 1. The actuator 3 having the communication function includes the communication block 31, the drive block 32, the actuator 33, the detection block 34, and the sensor 35. The communication block 31 communicates with the control station communication block 2, and exchanges transmission and reception data between the drive block 32 of the actuator 33 and the detection block 34 of the sensor 34.

The detection block 34 includes a sensor control circuit 341 and an analog to digital conversion circuit (ADC) 342.

The sensor control circuit 341 outputs the sensor control data to the ADC 342, and outputs sensor data from the sensor converted into digital data by the ADC 342 to the communication block 31, based on control data of the sensor 35 through the communication block 31. The ADC 342 converts the sensor control data from the sensor control circuit 341 into an analog signal, outputs the converted signal to the sensor 35, converts the analog sensor data from the sensor 35 into the digital data, and outputs the converted data to the sensor control circuit 341. The sensor 35 may also include the ADC 342 therein.

The sensor data is transmitted by the communication block 31 at the same timing (signal transmission period) as that in transmission of the transmission data from the actuator control circuit 321.

According to the present example, in the situation where the power supplying from the DC power source to the power line is continued, it is possible to realize the communication using the power line. Specifically, detection block 34 and the sensor 35 do not generally have a factor causing the power source Vb to be fluctuated such as PWM control of the drive block 32 and the actuator 33. Therefore, a timing of the current communication by the communication block 31 may be controlled as described in Example 1. Also, in the present example, the communication error does not occur in the current communication between the actuator 3 and the control station communication block 2 by exchanging data during the communication period.

Example 5

FIG. 17 is a configuration example to which Example 1 is applied as the electronic control apparatus in which a plurality of the ECUs 1a and 1b are connected to the power source 5 through a bus. Each of the ECUs 1a and 1b is connected to each power line communication apparatus. For example, the power line communication apparatus connected to the ECU 1a includes an actuator 3a having the communication function and a sensor 3b having the communication function in the power line 4a connected to the communication block 2a. The power line communication apparatus connected to the ECU 1b also has the same configuration. For example, in FIG. 16, the sensor 3b having the communication function is the actuator 3 having the communication function excluding the drive block 32 and the actuator 33.

According to the present example, in the situation where the power supplying from the DC power source to the power line is continued, it is possible to realize communication using the power line. Specifically, also in the present example, since the actuators 3a and 3c are controlled similar to Example 1, the communication error does not occur in the current communication between the actuator having the communication function or each of sensors 3a to 3d having the communication function and the control station communication blocks 2a and 2b by exchanging data during the communication period.

According to the described embodiment, in the situation where the power supplying from the DC power source to the power line is continued, it is possible to realize the communication using the power line.

REFERENCE SIGNS LIST

1: ECU, 2: control station communication block, 3: actuator, 4: power line, 5: power source, 21: voltage modulation circuit, 22: current demodulation circuit, 23: communication logic circuit, 221: current detection circuit, 222: reception identification device, 31: communication block, 32: drive block, 33: actuator, 34: detection block, 35: sensor, 311: current modulation circuit, 312: voltage demodulation circuit, 313: communication control circuit, 314: series circuit for preventing ringing, 321: actuator control circuit, 322: drive circuit, 3211: control circuit, 3212: operation timing control circuit, 341: sensor control circuit, 342: ADC.

The invention claimed is:

1. A power line communication apparatus comprising:
a drive block that includes an actuator control circuit that generates a control pulse for controlling an actuator and controls a transition timing of the control pulse during an operation period set within a communication cycle by a communication clock, and a drive circuit controlling a driving current of the actuator supplied from a DC power source through a power line based on the control pulse in which the transition timing is controlled; and
a communication block that generates the communication clock, and modulates a current flowing through the power line in response to data to be transmitted during a signal transmission period different from the operation period, set within the communication cycle.

2. The power line communication apparatus according to claim 1,
wherein the actuator control circuit includes an operation timing control circuit that controls the transition timing of the control pulse.

3. The power line communication apparatus according to claim 2,
wherein modulation of the current flowing through the power line by the communication block causes a transmission current waveform output from the modulation of the current flowing through the power line to transition with respect to a predetermined reference current.

4. The power line communication apparatus according to claim 3,
wherein the transition of the transmission current waveform with respect to the predetermined reference current is rising transition when the data is 1 and falling transition when the data is 0.

5. The power line communication apparatus according to claim 4, further comprising:
a current demodulation circuit that is connected to the communication block through the power line, detects the transition of the transmission current waveform with respect to the predetermined reference current flowing through the power line, and identifies a code of the data based on a direction of the detected transition.

6. The power line communication apparatus according to claim 1,
wherein the communication block connects a series circuit for preventing ringing to the power line.

7. An electronic control apparatus comprising:
a first communication block that transmits a control command for controlling an actuator from an electronic control unit (ECU), and receives data of control state information of the actuator;
a drive block that includes an actuator control circuit that generates a control pulse for controlling the actuator corresponding to a control command, and controls a transition timing of the control pulse during an operation period set within a communication cycle by a communication clock, and a drive circuit controlling a driving current of the actuator supplied from a DC power source through a power line based on the control pulse in which the transition timing is controlled; and a second communication block that is connected to the first communication block through the power line, generates the communication clock, and modulates a current flowing through the power line in response to the data to be transmitted to the first communication block during a signal transmission period different from the operation period, set within the communication cycle.

8. The electronic control apparatus according to claim 7, wherein the actuator control circuit includes an operation timing control circuit for controlling the transition timing of the control pulse.

9. The electronic control apparatus according to claim 8, wherein modulation of the current flowing through the power line by the second communication block causes a transmission current waveform of the modulation of the current flowing through the power line to transition with respect to a predetermined reference current.

10. The electronic control apparatus according to claim 9, wherein the transition of the transmission current waveform with respect to the predetermined reference current is rising transition when a code of the data is 1, and falling transition when a code of the data is 0.

11. The electronic control apparatus according to claim 10, wherein the first communication block includes a current demodulation circuit that detects the transition of the transmission current waveform with respect to the predetermined reference current flowing through the power line, and identifies a code of the data based on a direction of the detected transition.

12. The electronic control apparatus according to claim 7, wherein the first communication block performs voltage modulation on the control command, and transmits the modulated control command through the power line.

13. The electronic control apparatus according to claim 7, wherein the second communication block connects a series circuit for preventing ringing to the power line.

14. The electronic control apparatus according to claim 7, further comprising:

a detection block that outputs sensor data from a sensor to the second communication block, wherein the second communication block modulates the current flowing through the power line in response to the sensor data to be transmitted to the first communication block during the signal transmission period.

15. The electronic control apparatus according to claim 7, wherein a plurality of configurations including the ECU, the first communication block, and the second communication block are connected to the DC power source through the power line.

* * * * *